United States Patent [19]
Goller

[11] 3,803,873
[45] Apr. 16, 1974

[54] UNIVERSAL JOINT REPAIR ASSEMBLY
[75] Inventor: William W. Goller, Defiance, Ohio
[73] Assignee: The Zeller Corporation, Defiance, Ohio
[22] Filed: July 21, 1972
[21] Appl. No.: 274,089

[52] U.S. Cl.................... 64/17 A, 85/8.3, 308/236
[51] Int. Cl............................................. F16d 3/26
[58] Field of Search........ 64/17 R, 17 A; 287/52.09; 85/8.3, 8.9; 308/236

[56] References Cited
UNITED STATES PATENTS
| | | | |
|---|---|---|---|
| 3,481,159 | 12/1969 | Kayser | 64/17 A |
| 2,036,978 | 4/1936 | Anderson | 64/17 A |
| 3,145,547 | 8/1964 | Lyons | 64/17 A |

FOREIGN PATENTS OR APPLICATIONS
| | | | |
|---|---|---|---|
| 469,719 | 7/1937 | Great Britain | 64/17 R |
| 589,462 | 3/1959 | Italy | 64/17 A |

Primary Examiner—Samuel Scott
Assistant Examiner—Randall Heald
Attorney, Agent, or Firm—Allen D. Gutchess, Jr.

[57] ABSTRACT

A universal joint construction is provided which includes a replacement bearing cup assembly capable of being assembled with a yoke and a trunnion in a predetermined position. The assembly can take place in the field or shop without special tools or equipment. The replacement bearing cup has an outer annular groove which is located so as to be aligned with a corresponding groove in the bore of the yoke arm when properly positioned in the yoke arm relative to a cross member of the universal joint. The replacement assembly includes a preformed ring which is effective to hold the bearing cup in the bore by extending into both the annular groove of the cup and the annular groove of the bore.

8 Claims, 6 Drawing Figures

3,803,873

3,803,873

UNIVERSAL JOINT REPAIR ASSEMBLY

This invention relates to a universal joint construction and more particularly to a replacement bearing cup assembly for universal joints.

It is now common in the design of universal joints to hold the bearing cup in the yoke arm by means of a plastic ring extending into an annular groove in an intermediate portion of a bore in the yoke arm and into a corresponding annular groove on the outer surface of the bearing cup. The plastic ring is formed by positioning the cup in the bore with the grooves aligned and then injecting plastic material through a small passage in the yoke arm into the matching grooves. This provides an inexpensive yet secure and accurate means of assembling and affixing the cup in the yoke arm. However, when the universal joint needs to be repaired, a problem is presented, because the plastic injection machines for the plastic rings are not readily available in the field or shop. Further, the hardened plastic material in the yoke arm passage would also require being cleaned out prior to the injection of new plastic material, a difficult job at best.

The present invention is concerned with replacement bearing cup assemblies for universal joints. For some universal joints, the outer surface of the yoke arm is machined to establish an accurate locating surface by means of which a replacement bearing cup can be positioned. Regardless of this, however, the annular groove located in an intermediate position in the yoke arm bore can be used as a locating surface in combination with the annular groove on the bearing cup to accurately position the replacement bearing cup in the yoke arm.

In accordance with the invention, basically the replacement bearing cup assembly includes a bearing cup having an outer annular groove positioned to be aligned with a groove in the yoke arm bore, and a ring which is of a size and shape to extend at least partially into the annular grooves in both the cup and the bore. Further with the assembly according to the present invention, bearing cups and cross members can be readily replaced without any special tools being required. The replacement also can be achieved with a minimum amount of time and labor.

It is, therefore, a principal object of the invention to provide replacement bearing cup assemblies for universal joints of the type having intermediate grooves in the yoke arm bores, which grooves are effective to aid in positioning both the original and replacement bearing cups in the yoke arms.

Another object of the invention is to provide a universal joint with replacement bearing cup assemblies which can be installed without the need for special tools or machines.

A further object of the invention is to provide replacement bearing cup assemblies which can be installed with a minimum amount of time and labor.

Many other objects and advantages of the invention will be apparent from the following detailed description of preferred embodiments thereof, reference being made to the accompanying drawings, in which.

Figure 1:
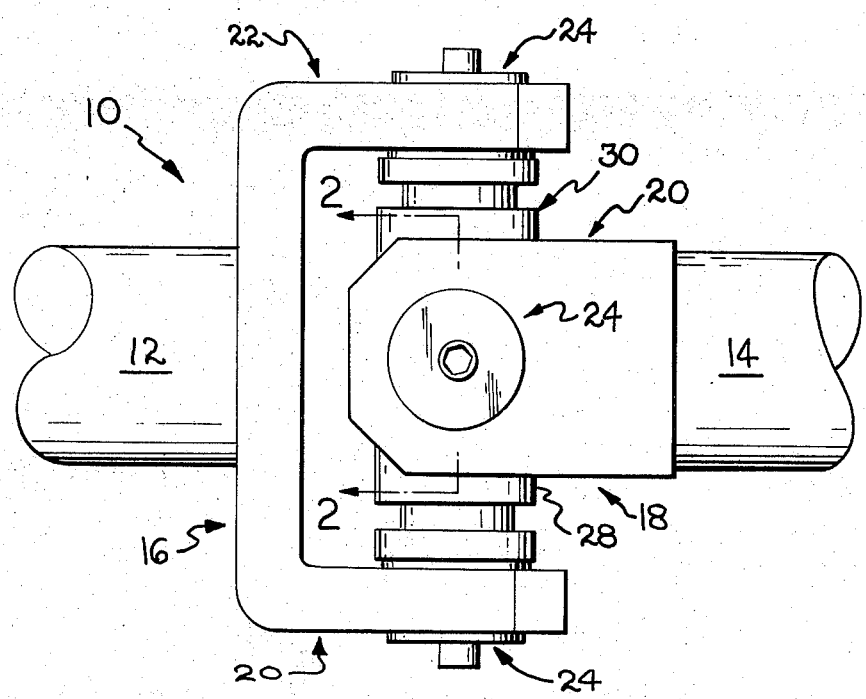
FIG. 1 is a side view in elevation of a universal joint embodying the invention.

Referring to the drawings and particularly to FIG. 1, a universal joint embodying the invention is indicated at 10 and connects driving and driven members 12 and 14 in the usual manner. The universal joint 10 includes two yokes 16 and 18 disposed at mutually perpendicular angles, each having arms 20 and 22 holding bearing cups 24. The bearing cups 24 receive trunnions 26 (see FIG. 2) which extend outwardly from a body 28 of a cross member 30. The cross member 30 can be of a conventional design and provided with suitable lubrication passages 32 which communicate with a grease fitting (not shown) to supply lubricant to bearings 34 disposed between the cups 24 and the trunnions 26. Suitable resilient seals 36 are held in grooves 38 near the inner or open ends of the cups 24 and bear against a portion of the cross member body 28 to seal the lubricant in the cup 24 and to keep out dirt.

The original bearing cup employed in a bore 40 of the yoke arm 20 or 22 was of a conventional design with a smooth, cylindrical outer surface except for an annular intermediate groove therein. The grove in the cup matched an intermediate annular groove 42 in the bore 40 when the original bearing cup was properly positioned in the bore 40. With the two grooves in alignment, plastic material was then injected through a suitable small passage 44 in the yoke arm, with the plastic material completely filling the matching annular grooves and forming a plastic ring therein. This type of mounting for the bearing cup constituted an inexpensive, quick, and accurate means for holding the original cup in the yoke arm 20 or 22.

Periodically, it is necessary to replace the bearing cups and the cross members due to wear of the trunnions, cups, and bearings. The original cups can be pushed out of the bores 40 in the yoke arms by applying sufficient pressure to shear the plastic rings. However, installing replacement bearing cups in the field or in the shop presents another problem because plastic injection machines are not readily available for supplying new plastic material into the bore groove 42 and the aligned groove in the replacement bearing cup. Further, the passage 44 would also have to be cleaned out in order to inject the new plastic material.

The replacement bearing cup 24 embodying the invention achieves the desired characteristics needed for relatively easy and simple replacement. The bearing cup 24 and the others to be subsequently discussed can be assembled by being inserted into the bore 40 from outside the arms 20 and 22. This is a necessity in order to be able to assemble the bearing cup with the trunnions 26 of the cross members 30 and with the yokes 16 and 18. The bearing cups can also be assembled without any special tools being required and accurate assembly of the replacement bearing cups with the yoke arms is also achieved, this being necessary in order to obtain proper clearance between the cross members and the bearing cups.

To achieve these desiderata, the bearing cup 24 has an outer intermediate annular groove 46 which is positioned to be aligned with the groove 42 when the bearing cup 24 is properly positioned in the bore 40. In this instance, the cup 24 also has a longitudinally extending groove 48 which tapers from a full depth at a closed end 50 of the cup to substantially zero toward the open end of the cup, adjacent the seal 36. The bottom of the groove 48, as shown, actually is of a shallow arcuate configuration.

The replacement bearing cup assembly further includes a split retaining ring 52 which, in transverse cross section, has an arcuate outer surface 54 and a flat inner surface 56. When the ring 52 is in contact with the bottom of the groove 46, the outer surface 54 does not extend beyond the outer surface of the cup 24 so that the cup and ring assembly can be inserted into the bore 40. When the groove 46 is aligned with the bore groove 42, a retaining pin 58 can be inserted into the longitudinally extending groove 48 between ends 60 of the ring 52. The pin 58 has a tapered forward end 61, to aid in being inserted between the ends 60 of the ring 52, and has a tapered configuration to fit with the longitudinally extending groove 48 of the cup 24. The ring 52 preferably is of a sufficiently large diameter, when in an unstressed state, to equal or exceed the diameter of the bore 42. In such an instance, the ends 60 of the ring 52 will be spaced apart a distance at least equal to the width of the retaining pin 58 when the ring is seated in the groove 42. The presence of the retaining pin 58 prevents the ring 52 from being compressed under stress or load on the bearing cup and universal joint sufficiently to enable the ring to be forced out of the bore 42.

The retaining ring 52 can also have an unstressed condition in which its inner diameter does not exceed the diameter of the cup at the bottom of the groove 46. In this instance, the cup 24 and the ring 52 can be inserted in the bore 40 without compressing the ring. The pin 58 will then spread the ring ends 60 to move the ring 52 into the bore groove 42.

Figure 2:
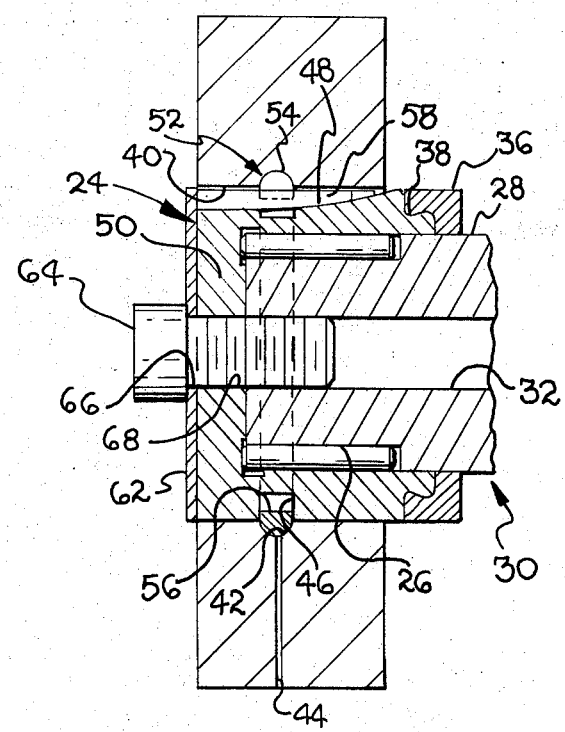
FIG. 2 is an enlarged view in cross section, taken along the line 2—2 of FIG. 1 of part of the universal joint and a replacement bearing cup assembly according to the invention.
Figure 3:
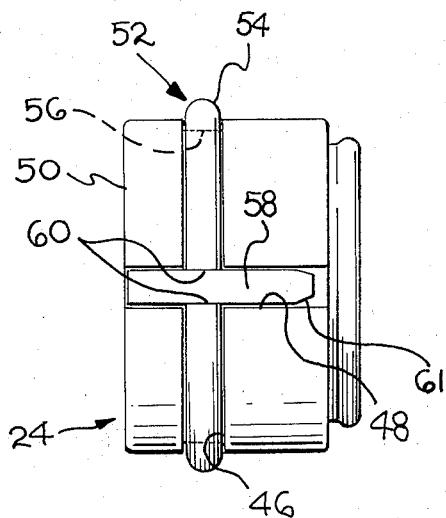
FIG. 3 is a top view of the bearing cup assembly shown in FIG. 2.

In the embodiment of FIG. 2, the retaining pin 58 is maintained in the groove 48 by a circular retaining plate 62 having a diameter about equal to that of the bearing cup 24 and having a portion extending over the outer or deep end of the groove 48 to prevent the retaining pin 58 from moving outwardly. The retaining plate 62 in this instance is held by a hex-head cap screw 64 extending through an opening 66 in the plate 62 and threadedly received in a tapped opening 68 in the closed end 50 of the bearing cup 24.

Figure 4:
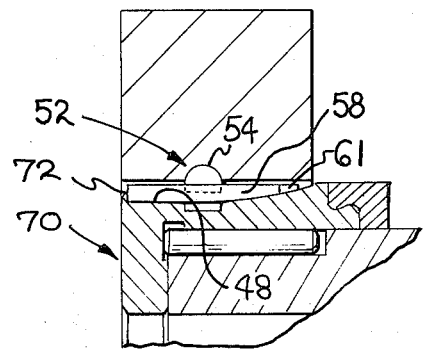
FIG. 4 is a fragmentary view in cross section of a slightly modified bearing cup assembly.

Referring to FIG. 4, a slightly modified bearing cup assembly includes a bearing cup 70 which is similar to the bearing cup 24 except not having the threaded hole 68 in the closed end thereof. In this instance, the bearing cup 70 retains the pin 58 in the groove 48 by a flange or ear 72 extending over the end of the groove 48, the ear 72 being formed simply by peening over a portion of the closed end of the bearing cup 70 adjacent the groove.

Figure 5:
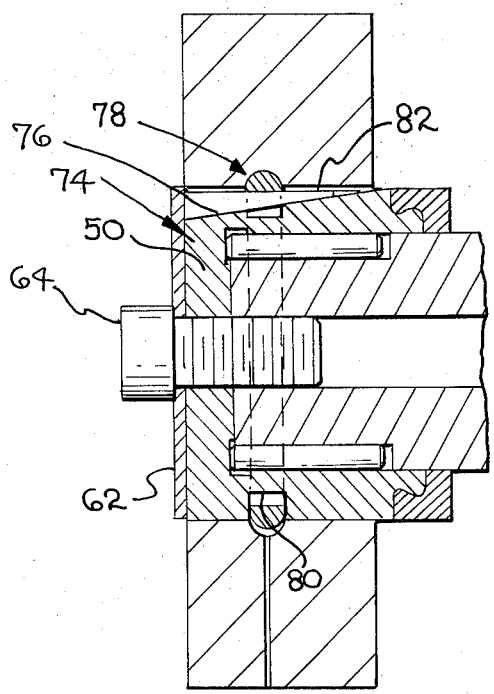
FIGS. 5 and 6 are views similar to FIG. 2 of modified bearing cup assemblies according to the invention.

FIG. 5 shows a slightly modified bearing cup assembly in which the retaining pin cooperates with the preformed retaining ring in a slightly different manner. In this instance, a bearing cup 74 is similar to the bearing cup 24 except that a longitudinally extending groove 76 therein has a straight taper rather than an arcuate bottom. A split retaining ring 78 can be similar to the ring 52 but the ring 78 definitely has an unstressed condition in which its inner diameter exceeds the inner diameter of an annular groove 80 in the cup 74.

A retaining pin 82 has a straight taper and can be inserted into the longitudinally extending groove 76 with the pointed end extending between the inner surface of the ring 78 and the bottom of the tapered groove 76. The retaining pin 82 moves the ring 78 outwardly into contact with the groove 42, but with the inner diameter of the ring 78 still extending into the groove 80 of the cup 74. The ring thereby maintains the cup 74 in place in the yoke arm. Retention of the pin 82 in the groove 80 can be achieved by the plate 62 of FIG. 2 or the ear 72 of FIG. 4, if desired.

The retaining pin 82 positions the ring 78 asymmetrically with respect to the axis of the cup 74 so that a portion of the ring 78 opposite the retaining pin 82 may not project into the bore groove 42, depending upon the unstressed size of the ring 78. The cooperation between the grooves 42 and 76 and the ring 78 is sufficient, however, to securely hold the replacement cup in proper position in the bore. The replacement bearing cup assembly of FIG. 5 has an advantage over that of FIGS. 2 and 4 in that the retaining ring need not be located in a particular position relative to the retaining pin when the bearing cup assembly is assembled with the yoke arm.

Figure 6:
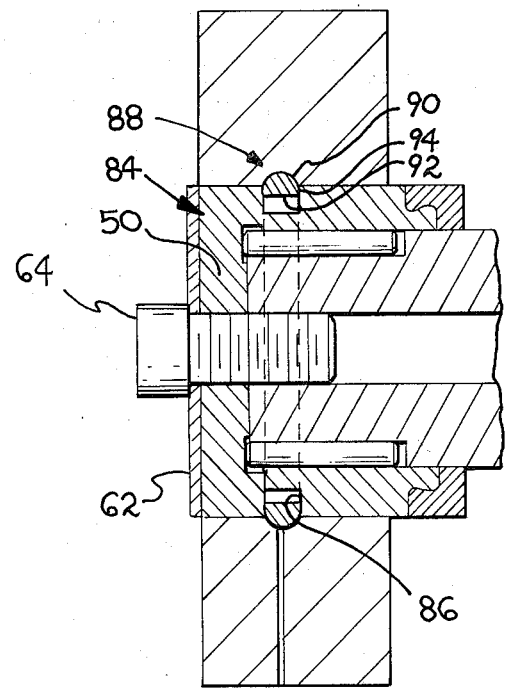

FIG. 6 shows a further modified replacement bearing cup assembly. In this instance, a replacement bearing cup 84 has an annular groove 86 therein which is designed to match or be aligned with the annular groove 42 in the bore 40 when the bearing cup 84 is properly positioned in the bore. A split ring 88 includes an outer round surface 90 and an inner flat surface 92 with side walls 94 which have at least partially substantially straight portions. The thickness of the ring 88 is no greater than the depth of the groove 86 so that the ring 88 will not exceed the diameter of the bore 40 when the cup is inserted thereinto with the ring compressed. When the grooves 86 and 42 are aligned, the ring 88 will spring outwardly to fully engage the groove 42. With the thickness of the ring 88 exceeding the depth of the groove 42, a portion of the ring 88 will extend into the groove 86 to hold the cup in place in the bore.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A universal joint comprising a yoke having a transverse bore and an annular groove at an intermediate location in said bore, a bearing cup in said bore, said bearing cup having an annular groove on the outer surface thereof and located to be aligned with the annular groove in said bore when the bearing cup is properly located in said bore relative to a trunnion of a cross member, a preformed ring extending into both of said annular grooves to hold said cup in a predetermined position in said bore, said bearing cup having a longitudinally extending groove on an outer surface thereof extending from the closed end at least to said bearing cup annular groove, said ring having a discontinuous portion aligned with said longitudinally extending groove, and an elongate member in said longitudinally extending groove and positioned, in part, between the ends of said ring to maintain said ring partially in said bore annular groove.

2. A universal joint according to claim 1 characterized by means associated with said cup for retaining said elongate member in said longitudinally-extending groove.

3. A universal joint comprising a yoke having a transverse bore and an annular groove at an intermediate location in said bore, a bearing cup in said bore, said bearing cup having an annular groove on the outer surface thereof and located to be aligned with the annular groove in said bore when the bearing cup is properly located in said bore relative to a trunnion of a cross member, a preformed ring extending into both of said annular grooves to hold said cup in a predetermined position in said bore, said bearing cup having a longitudinally extending groove on an outer surface thereof extending from the closed end at least to said bearing cup annular groove, said ring having a discontinuous portion aligned with said longitudinally extending groove, said portion being narrower than the width of said longitudinally extending groove when said ring is in an unstressed condition, and an elongate member in said longitudinally extending groove and positioned, in part, between the ends of said ring at said discontinuous portion to force the ends of said ring farther apart to maintain said ring partially in said bore annular groove.

4. A universal joint comprising a yoke having a transverse bore and an annular groove at an intermediate location in said bore, a bearing cup in said bore, said bearing cup having an annular groove on the outer surface thereof and located to be aligned with the annular groove in said bore when the bearing cup is properly located in said bore relative to a trunnion of a cross member, a preformed ring extending into both of said annular grooves to hold said cup in a predetermined position in said bore, said bearing cup having a longitudinally extending groove in an outer surface thereof extending from the closed end at least to said bearing cup annular groove, and an elongate member in said longitudinally extending groove and positioned, in part, in contact with said ring to maintain said ring partially in said bore annular groove.

5. A universal joint according to claim 4 characterized by said elongate member extending under said ring and in contact with a part of the inner surface of said ring.

6. A universal joint comprising a yoke having a transverse bore and an annular groove at an intermediate location in said bore, a bearing cup in said bore, said bearing cup having an annular groove on the outer surface thereof and located to be aligned with the annular groove in said bore when the bearing cup is properly located in said bore relative to a trunnion of a cross member, each of said annular grooves having predetermined depths, a preformed ring having at least one discontinuous portion, said ring extending into both of said annular grooves to hold said cup in a predetermined position in said bore, the thickness of said ring in transverse cross section being greater than the depth of said bore annular groove and not greater than the depth of said bearing cup annular groove, whereby said cup and said ring can be first assembled and then inserted into said bore, and means carried by said cup and extending into the discontinuous portion of said ring to prevent substantial narrowing of said discontinuous portion.

7. A universal joint according to claim 6 characterized by means associated with said cup for retaining said last-named means in position.

8. A universal joint comprising a yoke having a transverse bore and an annular groove at an intermediite location in said bore, a bearing cup in said bore, said bearing cup having an annular groove on the outer surface thereof and located to be aligned with the annular groove in said bore when the bearing cup is properly located in said bore relative to a trunnion of a cross member, each of said annular grooves having predetermined depths, and a preformed ring having a least one discontinuous portion, said ring extending into both of said annular grooves to hold said cup in a predetermined position in said bore, the thickness of said ring in transverse cross section being greater than the depth of said bore annular groove and not greater than the depth of said bearing cup annular groove, whereby said cup and said ring can be first assembled and then inserted into said bore, said bearing cup annular groove having straight side wall portions, and said preformed ring having straight side wall portions engaged with the side wall portions of said bearing cup groove when said bearing cup is in the predetermined position in said bore.

* * * * *